United States Patent
Vella (10) Patent No.: US 10,670,321 B1
(45) Date of Patent: Jun. 2, 2020

(54) ICE CHUTE

(71) Applicant: Anthony Vella, Bristol, TN (US)

(72) Inventor: Anthony Vella, Bristol, TN (US)

( * ) Notice: Subject to any disclaimer, the term of this patent is extended or adjusted under 35 U.S.C. 154(b) by 0 days.

(21) Appl. No.: 16/748,066

(22) Filed: Jan. 21, 2020

(51) Int. Cl.
*F25C 5/20* (2018.01)
*A47J 31/40* (2006.01)

(52) U.S. Cl.
CPC ............... *F25C 5/24* (2018.01); *A47J 31/40* (2013.01)

(58) Field of Classification Search
CPC .......... F25C 5/182; F25C 5/24; F25D 31/002; F25D 3/04; F25D 31/006; B67D 1/0065; B67D 1/06; B67D 2210/00034
See application file for complete search history.

(56) References Cited

U.S. PATENT DOCUMENTS

| | | | | |
|---|---|---|---|---|
| 5,397,032 | A | * | 3/1995 | Landers .................. B67D 1/06 222/146.6 |
| 5,697,561 | A | * | 12/1997 | Plank ..................... F25C 5/046 241/100 |
| 2001/0037657 | A1 | * | 11/2001 | Dasher ................... F25C 5/182 62/459 |
| 2011/0138821 | A1 | * | 6/2011 | Chase ...................... F25C 5/24 62/71 |

* cited by examiner

*Primary Examiner* — Elizabeth J Martin
(74) *Attorney, Agent, or Firm* — Chambliss, Bahner & Stophel, P.C.

(57) ABSTRACT

An ice chute for an ice bin that includes a front uncovered portion having an opening through which ice is deposited into the ice bin. The frame may be removably inserted into the ice bin via the opening. Once inserted, a rear portion of the frame is located below a rear covered portion of the ice bin and a front portion of the frame is located at the opening. An inclined ramp extends upward around the front portion of the frame. When the frame is inserted into the ice bin, a top end of the ramp is positioned vertically above the opening. An area defined by the top end of the ramp is larger than an area of the opening. The ramp is sized and configured such that ice on the ramp slides downwards along the ramp and into the opening of the ice bin.

19 Claims, 6 Drawing Sheets

ICE CHUTE

TECHNICAL FIELD

This invention relates generally to drop-in beverage and ice dispensers. More particularly, the invention relates to a removable chute and cover apparatus configured for use with a drop-in beverage and ice dispensers.

BACKGROUND OF THE INVENTION

Soft drink dispensers are found in many restaurants, amusement parks, movie theaters, and elsewhere. With initial reference to FIGS. 1 and 2, one type of drink dispenser is a drop-in counter unit 100 that is a combination of a fountain 102 and an ice bin 104. This type of dispenser is designed to be inserted partly below and to rest upon a counter top surface in a beverage serving area. Such dispenser units 100 are advantageous wherever the public wishes to obtain and consume chilled beverages. These units 100 are convenient in high-speed environments, such as amusements parks, theatres, sporting events, etc., where beverages must be prepared quickly, because they allow both beverages and ice to be dispersed from a single, compact device in a single location. Fountain 102 is typically provided with a tower portion 106 having multiple beverage dispensing valves 108 for dispensing a variety of carbonated beverages. A tray 110, typically provided with a perforated grate 112, is positioned directly underneath dispensing valves 108 to collect beverage that spills as it is dispensed. The ice bin 104 is formed by a large box-like enclosure having front wall 114, rear wall 116, and opposed side walls 118, and a flat top lip 120 surrounding an opening 122 through which ice is deposited for storage in the ice bin.

Figure 1:
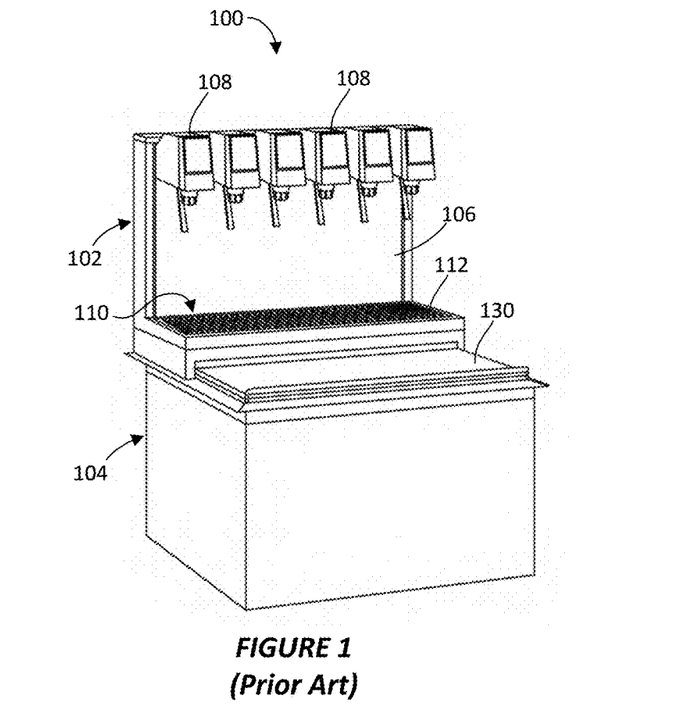
FIG. 1 is a perspective view depicting a conventional drop-in type drink dispenser.
Figure 2:
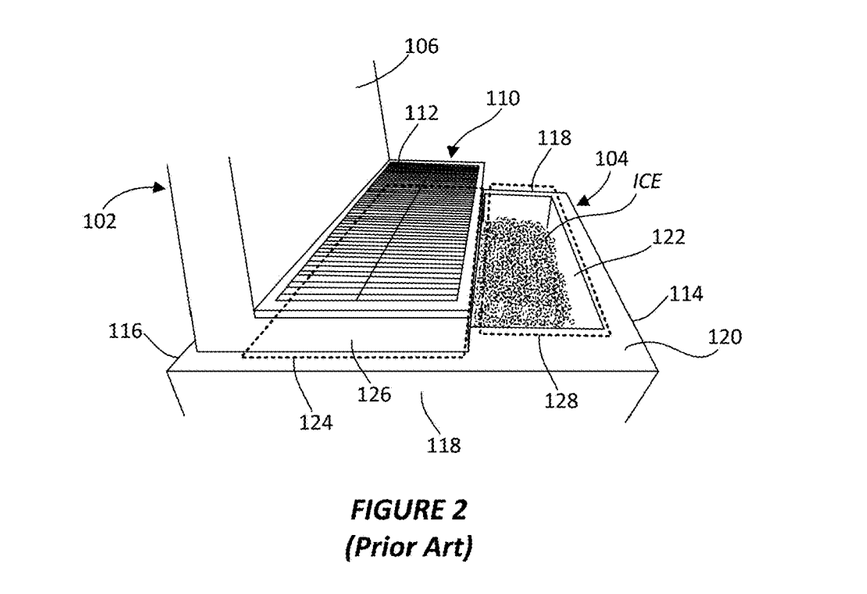
FIG. 2 is a perspective view depicting a portion of a fountain and ice bin of the drink dispenser of FIG. 1.

There are a number of safety and sanitation concerns with certain conventional drink dispensers, such as unit 100. The fountain 102 is typically positioned on top of the ice bin 104 rearward of the opening 122. Thus, a rear portion 124 of the ice bin is typically covered by a rear cover portion 126, which may be a portion of fountain 102. On the other hand, a front portion 128 of the ice bin 104 is left uncovered. This uncovered opening 122 is a potential source for contaminants (e.g., spilled beverage, trash, etc.) to be deposited into the ice bin 104. To prevent this type of contamination of the ice bin 104, certain units 100 may be provided with a slidable door 130 that slides front from beneath the fountain 102 from rear cover portion 126 to front portion 128 to cover opening 122. In fact, many safety codes mandate that ice bins 104 be provided with such a door for this purpose.

Collecting ice and water is also a safety and sanitation concern. As discussed above, the fountain 102 is typically provided with a perforated tray 110 that is positioned directly below the dispensing valves 108 and collects spilled beverages. Certain trays 110 are further provided with a drain (not shown) to drain away beverage collected by the tray. Thus, liquids do not typically collect on the fountain portion 102 of these drop-in units 100. While ice bin 104 may provide internal drainage to drain away liquid from ice melting inside of the ice bin, there is typically no such drainage provided for liquid on the exterior of the ice bin. In particular, it is common for ice to collect on the flat top lip 120 of the ice bin 104. This ice must be continually cleaned up or it will melt to create liquid water that collects on the top lip 120. Eventually, the collecting water drains back into the ice bin 104, whereupon it may re-freeze and be deposited on the inner surface of the ice bin, or drains onto the floor or counter surface surrounding the drop-in unit 100, which creates a safety and sanitation hazard. In addition to the slip and trip hazard caused by this collecting water, it also creates a potential for rot, mildew, etc. in and round the drop-in unit 100 and in the surrounding area.

Spilled ice is expensive. First, spilled ice must be replaced with new ice, which requires water, energy to freeze the water to form the ice, and time to create the ice. If one of these is missing, then the ice must be purchased. Additionally, spilled ice or water from melted ice should be cleaned up promptly to prevent the problems discussed above. In a business, an employee of the business would need to stop doing other productive tasks, such as selling and distributing the goods of the business, to clean up ice and mop up water. Thus, preventing or limiting spilled ice would save businesses money and time and makes them more efficient.

Therefore, what is needed, is an apparatus that allows ice to be dispersed quickly from an ice bin, such as from unit 100, while also enabling the ice to be covered to prevent contaminants and also limiting or preventing ice and water from collecting on and around the ice bin.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

BRIEF SUMMARY OF THE INVENTION

The above and other needs are met by an ice chute configured for removable insertion into an ice bin. The ice bin includes a front wall, rear wall, opposed side walls, a rear covered portion, and a front uncovered portion having an opening through which ice is deposited into the ice bin. The ice chute includes an elongate frame having a rear portion and a front portion. The frame is sized and configured for slidable insertion into the ice bin via the opening such that the rear portion of the frame is located below the rear covered portion of the ice bin and the front portion of the frame is located at the opening of the ice bin. A ramp extends upwards and is inclined around the front portion of the frame. When the frame is inserted into the ice bin, a top end of the ramp is positioned vertically above the opening and an area defined by the top end of the ramp is larger than an area of the opening. The ramp is sized and configured such that ice on the ramp slides downwards along the ramp and into the opening of the ice bin.

In certain embodiments, the frame includes a rectangular enclosure formed by a front wall, rear wall, and opposed side walls connecting the front and rear walls. In certain embodiments, the frame also includes a slide rail having side portions that extend inwardly from an inner surface of each of the opposed side walls. A door is configured to slide along the slide rails between a rear position, where ice may be deposited into the ice bin via the opening, and a front position, where the opening is covered by the door and prevents ice from being deposited into the ice bin via the opening. In some embodiments of the invention, the frame includes a rear wall and the slide rail further comprises a rear portion extending inwardly from an inner surface of rear wall of the frame and connected continuously with the side portions of the slide rail. In preferred embodiments, the ice chute is sized and configured to be supported in the opening of the ice bin by the front portion of the frame contacting the front wall of the ice bin and a rear edge of the ramp contacting the covered rear portion of the ice bin.

In certain embodiments, a front lip extends upwardly from a front edge of the door. Preferably, the front lip is sized such that it extends higher than a bottom surface of the rear covered portion of the ice bin when the ice chute is inserted into the ice bin, such that the front lip would contact the rear covered portion of the ice bin to prevent the front edge of the door from sliding rearwards to a position below the rear covered portion of the ice bin. Additionally, in certain embodiments, a lip also extends upwardly from opposite side edges and a rear edge of the door, which lip is configured to provide rigidity to the door and is sized to slide under the rear covered portion. In certain embodiments, the frame includes a rear wall and the door comprises a front edge and a rear edge, wherein the door is sized such that the rear edge contacts the rear wall of the frame before the front edge is positioned under the rear covered portion of ice bin.

Preferably, the ramp includes opposing left and right ramp surfaces and a front ramp surface that are connected together to form a continuous ramp surface. Lips preferably extend inwardly from rear ends of each of the left and right ramp surfaces. In certain embodiments, each of the left and right ramp surfaces are inclined by an angle α with respect to an axis A extending along a length of the front ramp surface. Furthermore, the front ramp surface is inclined by an angle β with respect to an axis B that extends along a length of the left and right ramps. The angle α may be the same or different from the angle β. Additionally, the angle α and the angle β range from approximately 15° to approximately 60°. In certain cases, the angle α and the angle β are each approximately 45°.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and in which.

DETAILED DESCRIPTION OF THE INVENTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

The illustrated embodiments and the following description describe ice chute apparatus and a related method of use in connection with a fountain drink dispenser drop-in counter unit 100. However, the drink dispenser need not take the form of a drop-in unit 100, but can instead be any type of fountain drink and ice dispenser unit or even an ice-only dispenser unit. Now, with reference now to FIGS. 3-6A, there is provided an ice chute 200 configured for removable insertion into an ice bin 104 (shown in FIGS. 1 and 2) according to an embodiment of the present invention. Ice chute 200 includes an elongate frame 202 having a rear portion and a front portion (identified, generally, by reference numbers 204 and 206, respectively). In the illustrated embodiment, frame 202 is a rectangular enclosure that is formed by a front wall 208, rear wall 210, and opposed side walls 212 connecting the front and rear walls. A ramp 214 extends upwards from around the front portion 206 of the frame 202. Additionally, lips 234 extend inwardly from rear ends of each of the left and right ramp surfaces 216. These lips 234 help to guide ice as it slides down the surface of the ramp and to prevent ice from sliding rearwards off of the ice chute 200 (i.e., towards fountain 102, shown in FIG. 1).

Figure 5:
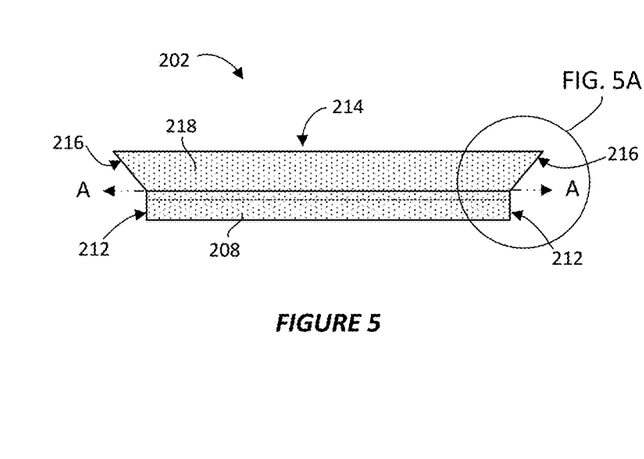
FIG. 5 is a front elevation view of the ice chute of FIG. 4.
Figure 5A:
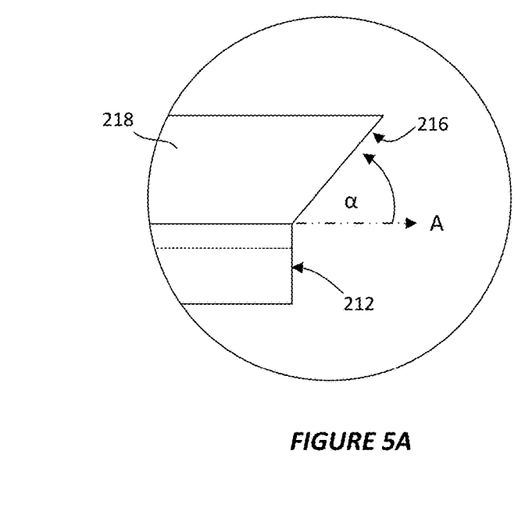
FIG. 5A is a detail view of a circled portion of the ice chute shown in FIG. 5 identified by "FIG. 5A"
Figure 6:
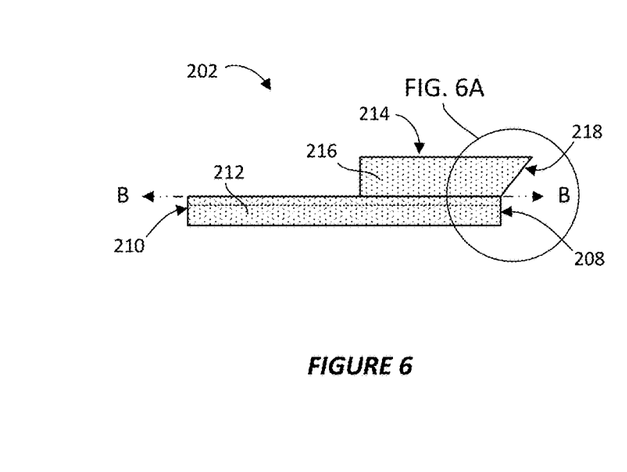
FIG. 6 is a left side elevation view of the ice chute of FIG. 4.
Figure 6A:
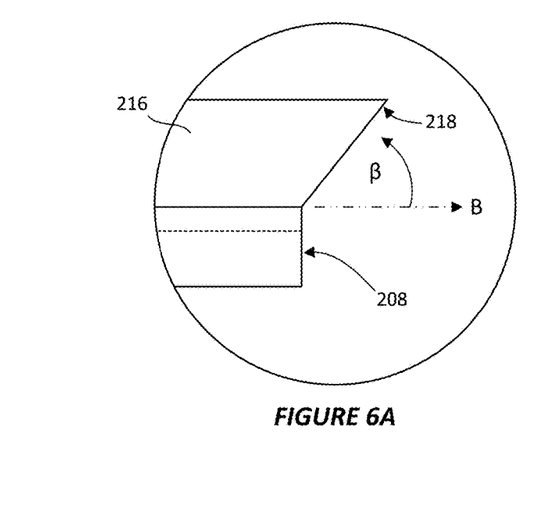
FIG. 6A is a detail view of a circled portion of the ice chute shown in FIG. 6 identified by "FIG. 6A"
Figure 7:
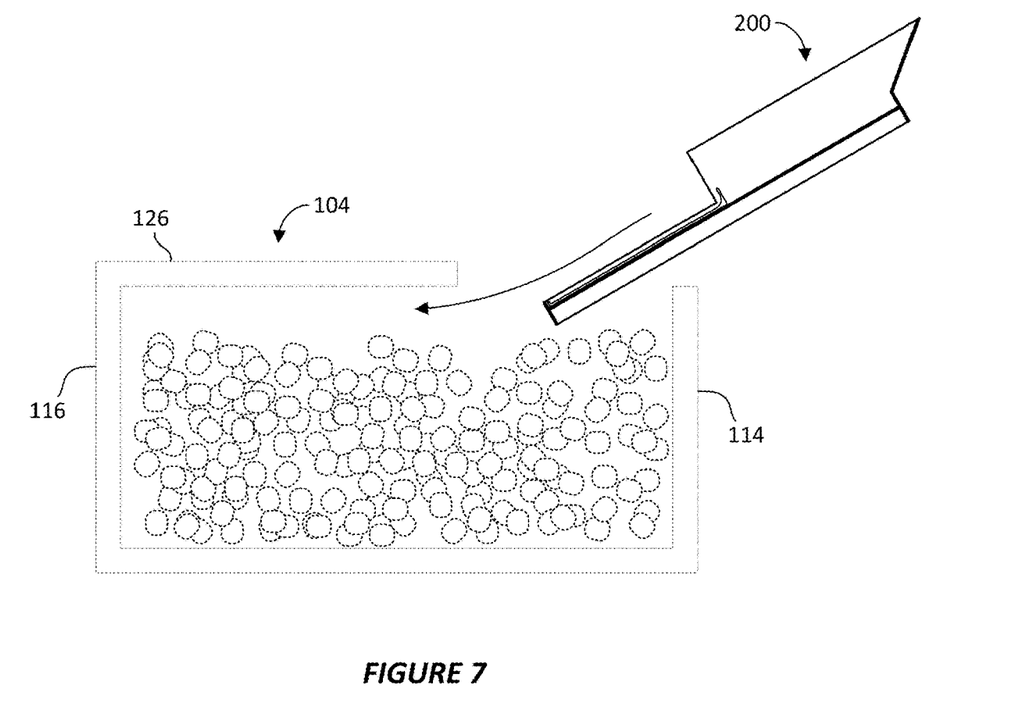
FIGS. 7 and 8 are cross-sectional views depicting the ice chute of FIG. 3 being inserted into ice bin.
Figure 8:
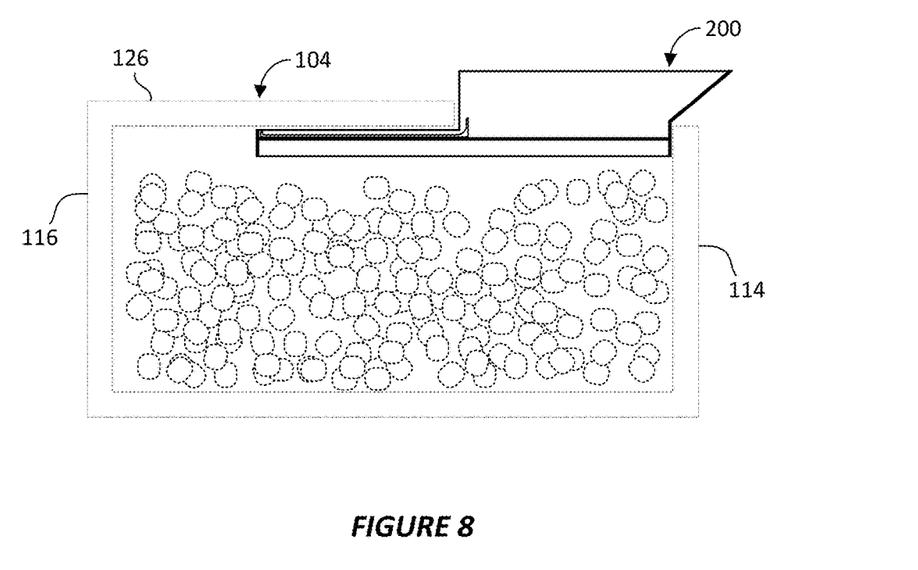

Preferably, the ramp 214 includes opposing left and right ramp surfaces 216 and a front ramp surface 218 that are connected together to form a continuous ramp surface. The ramp 214 is inclined such that ice on the ramp slides downwards along the ramp and into the opening of the ice bin automatically. In particular, each of the left and right ramp surfaces 216 are inclined by an angle α with respect to an axis A extending along a length of the front ramp surface 218. The angle α is shown in FIG. 5A for the right ramp surface 216 (as shown in FIG. 5). The angle α is preferably mirrored for the left ramp surface. However, it is also contemplated that left and right ramp surfaces 216 are inclined at a different angle α. Similarly, front ramp surface 218 is inclined by an angle β with respect to an axis B that extends along a length of the left and right ramps 216. In certain embodiments, angle α, angle β, or both range from approximately 15° to approximately 60°. However, greater or lesser angles may also be utilized. Angles α and β may be the same or they may be different. In certain embodiments, angles α and β are each 45° relative to their respective axes A, B.

With reference again to FIGS. 3 and 4 and with further reference to FIGS. 7-12, ice chute 200 is sized and configured for slidable insertion into and removal from the ice bin 104 via the opening 122. When the ice chute 200 is inserted into the ice bin 104, the rear portion 204 of the frame 202 is located below the rear cover portion 126 of the ice bin. Additionally, the frame 202 is sized such that the front portion 206 is located at the opening 122 of the ice bin 104. The frame 202 is preferably supported in opening 122 at two points of contact. In particular, a front surface of front wall 208, front ramp surface 218, or both contacts front wall 114 of the ice bin 104. Additionally, a top end of the rear portion 204 of the frame 202 contacts a bottom surface of rear cover portion 126. Frame 202 is provided with a slide rail 220, which includes side portions 222 and rear portion 224, each extending inwardly from an inner surface of each of the opposed side walls 212 and rear wall 210. Preferably, the side portions 222 and rear portion 224 are connected together to form a continuous slide rail 220.

Figure 3:
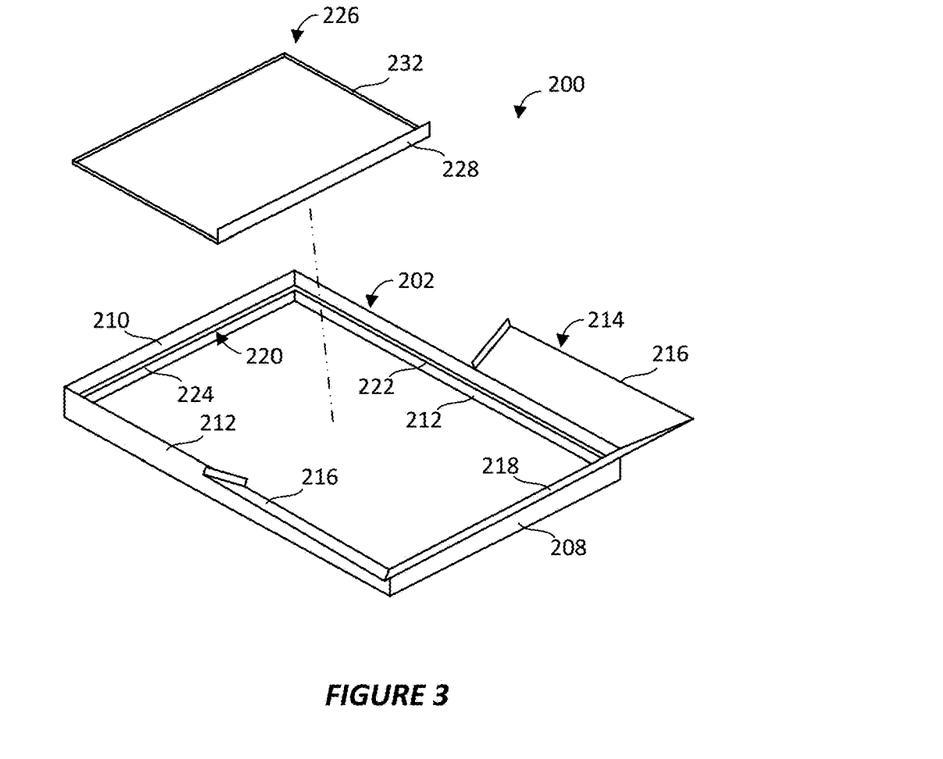
FIG. 3 is a perspective view depicting an ice chute according to an embodiment of the present invention.
Figure 4:
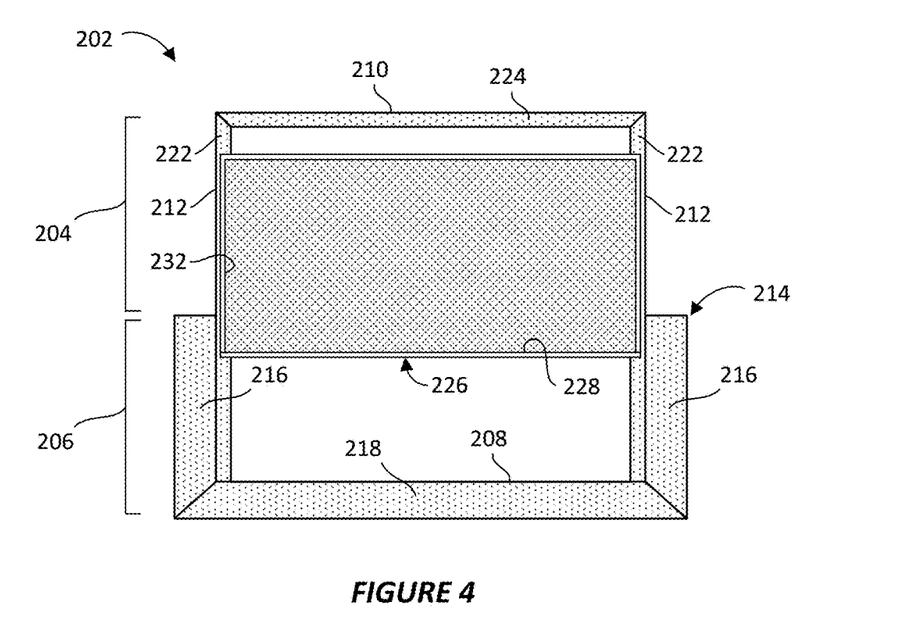
FIG. 4 is a top plan depicting the ice chute of FIG. 3.
Figure 9:
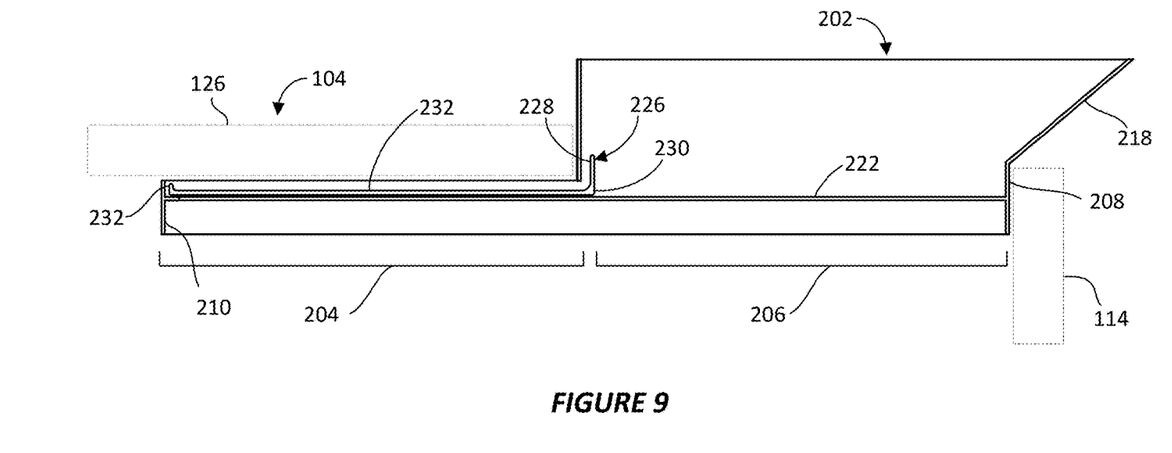
FIGS. 9 and 10 are cross sections views depicting the ice chute of FIG. 3 with a door in an open position and a closed position, respectively.
Figure 10:
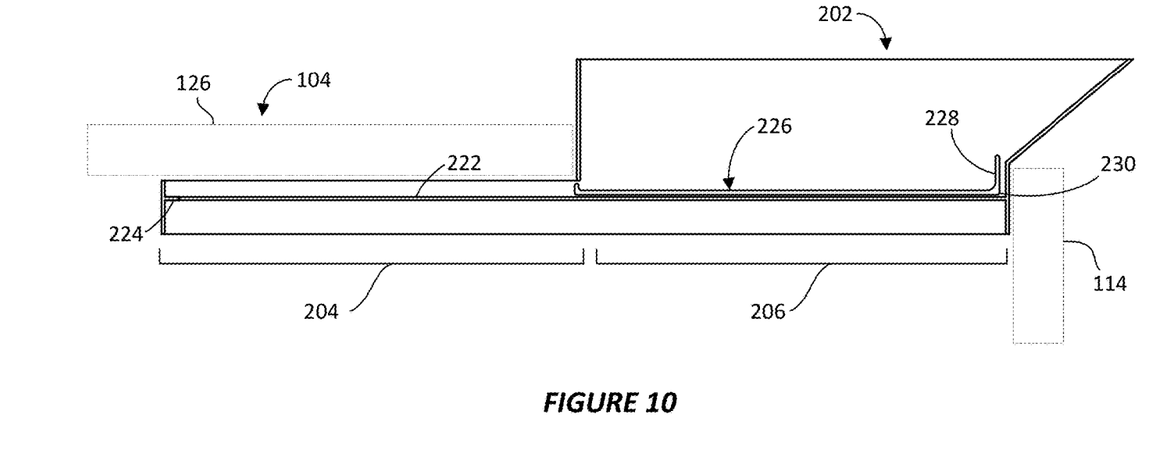

Ice chute 200 is provided with a door 226 that is configured to slide along the slide rail 220 between a rear position (FIGS. 9 and 11), where ice may be deposited into the ice bin via the opening, and a front position (FIGS. 10 and 12), where the opening is covered by the door and prevents ice from being deposited into the ice bin via the opening. In preferred embodiments, door 226 includes a front lip 228 extending upwardly from a front edge 230. The front lip 228 is sized such that it extends higher than a bottom surface of the rear covered portion 126 of the ice bin 104 when the ice chute 100 is inserted into the ice bin. As such, the front lip 228 would contact the rear covered portion 126 of the ice bin 104 in order to prevent the front edge 230 of the door 226 from sliding rearwards to a position below the rear covered portion of the ice bin. Additionally, as shown in FIG. 3, the door 226 preferably includes a smaller lip 232 that extends upwardly from side edges and a rear edge of the door. Lips 228, 232 stiffen door 226 and provide increased rigidity. As shown in FIG. 9, lip 232 is sized to slide under the rear covered portion 126. Preferably, the frame 202 and door 226 are sized such that the rear edge of the door contacts the rear wall 110 of the frame before the front edge 230 is positioned under the rear covered portion 126. This enables the front lip 228 to be slightly spaced away from the rear covered portion 126, such that the front lip can be easily grasped when moving the door to the forward position shown in FIG. 10.

Figure 11:
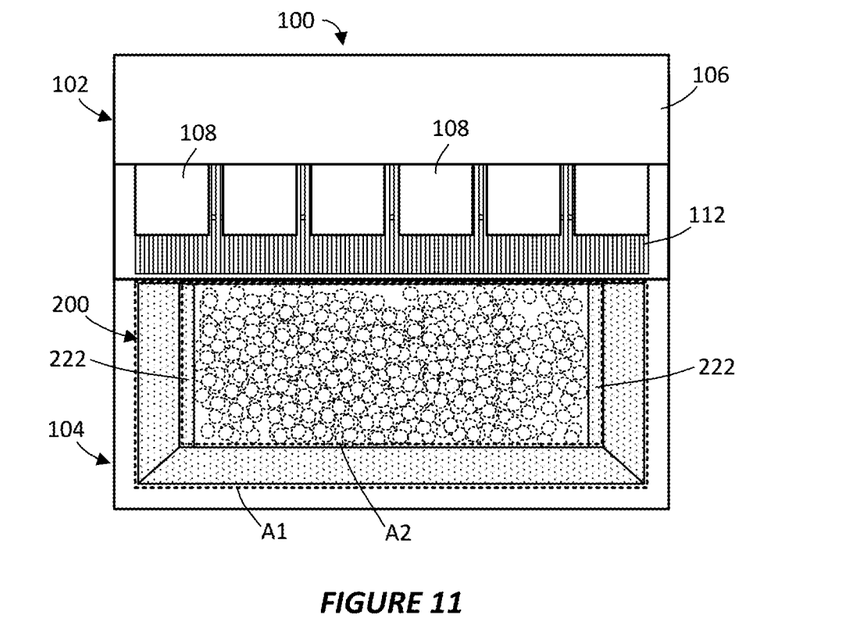
FIGS. 11 and 12 are plan views of a beverage dispenser having an ice chute installed and including a door in an open and closed position, respectively, according to an embodiment of the present invention.
Figure 12:
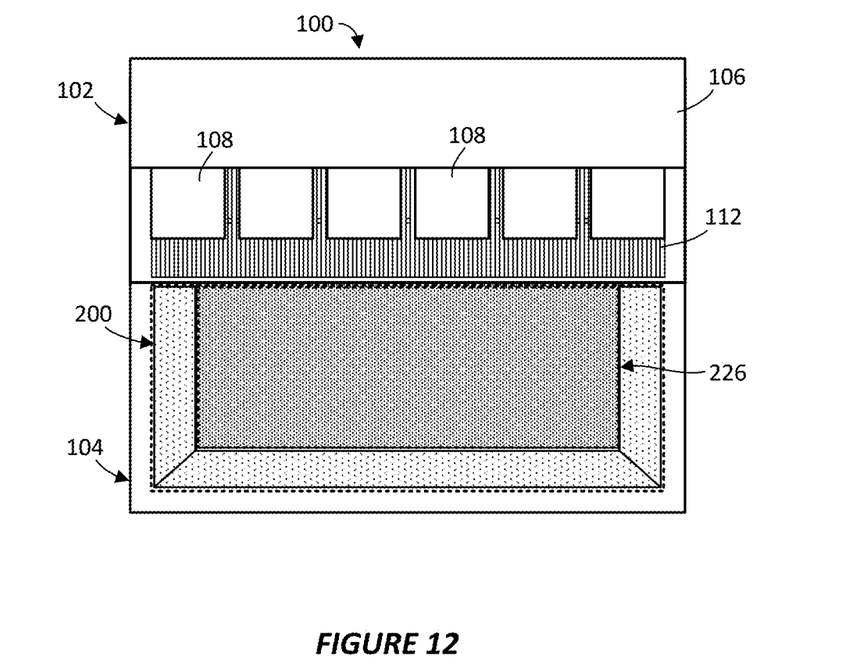

When the ice chute 200 is installed on an ice bin 104, the ramp 214 surrounds the opening 122, as shown best in FIGS. 11 and 12. From this top-down perspective, it can be seen that the ramp 214 covers a larger area A1 than the area A2 of the opening 122 alone, which effectively enlarges the opening and makes pouring ice into the ice bin easier. Additionally, as discussed above, the surfaces that form the ramp 214 are inclined, which prevents ice and water from collecting on the ramp and helps to prevent ice and water from spilling off of the ice bin 104. Instead, ice and water are guided, automatically, into the opening 122 of the ice bin 104. This, therefore, greatly reduces the chances that ice spills from the ice bin 104 and effectively eliminates the need to clean spilled ice and water. Lastly, the slidable door 226 addresses safety and sanitation concerns.

Although this description contains many specifics, these should not be construed as limiting the scope of the invention but as merely providing illustrations of some of the presently preferred embodiments thereof, as well as the best mode contemplated by the inventor of carrying out the invention. The invention, as described and claimed herein, is susceptible to various modifications and adaptations as would be appreciated by those having ordinary skill in the art to which the invention relates.

What is claimed is:

1. An ice chute for use with a drop-in ice bin, the ice bin having a perimeter wall, a bottom, and a partially-covered top having a rear covered portion that is covered by a top wall and a front uncovered portion having an opening through which ice is deposited into the ice bin, the ice chute comprising:
    a rigid elongate frame having a rear portion located below the rear covered portion of the ice bin and a front portion disposed in the opening of the ice bin, the frame sized to fit through the opening;
    a ramp having a lower end that is connected continuously along its length with the frame, the ramp extending upward and angling outward away from the front portion of the frame only and not extending over the rear portion of the frame, and the ramp extending out of the ice bin opening when the frame is disposed in the opening of the ice bin, such that a top end of the ramp is positioned vertically above the front portion of the frame and above the opening but is not positioned vertically above the rear portion of the frame and an area defined by the top end of the ramp is larger than an area of the opening such that the ramp does not fit through the opening,
    wherein the ramp is sloped such that ice on the ramp slides downwards along the ramp and into the opening of the ice bin via the opening.

2. The ice chute of claim 1 wherein the frame comprises a rectangular enclosure formed by a front wall, rear wall, and opposed side walls connecting the front and rear walls.

3. The ice chute of claim 1 wherein the frame comprises a rectangular enclosure having opposed side walls, the ice chute further comprising:
    a slide rail having side portions extending inwardly from an inner surface of each of the opposed side walls; and
    a door configured to slide along the slide rails between a rear position, where ice may be deposited into the ice bin via the opening, and a front position, where the opening is covered by the door and prevents ice from being deposited into the ice bin via the opening.

4. The ice chute of claim 3 wherein the door comprises a front lip extending upwardly from a front edge of the door, the front lip sized such that it extends higher than a bottom surface of the rear covered portion of the ice bin when the ice chute is inserted into the ice bin, such that the front lip would contact the rear covered portion of the ice bin to prevent the front edge of the door from sliding rearwards to a position below the rear covered portion of the ice bin.

5. The ice chute of claim 4 further comprising a lip extending upwardly from opposite side edges and a rear edge of the door, the lip configured to provide rigidity to the door and sized to slide under the rear covered portion.

6. The ice chute of claim 3 wherein the frame further comprises a rear wall and the door comprises a front edge and a rear edge, wherein the door is sized such that the rear edge contacts the rear wall of the frame before the front edge is positioned under the rear covered portion of ice bin.

7. The ice chute of claim 3 wherein the frame further comprises a rear wall and the slide rail further comprises a rear portion extending inwardly from an inner surface of rear wall of the frame and connected continuously with the side portions of the slide rail.

8. The ice chute of claim 1 wherein the ice chute is sized and configured to be supported in the opening of the ice bin by the front portion of the frame contacting the front wall of the ice bin and a rear edge of the ramp contacting the covered rear portion of the ice bin.

9. The ice chute of claim 1 wherein the ramp comprises opposing left and right ramp surfaces and a front ramp surface that are connected together to form a continuous ramp surface.

10. The ice chute of claim of 9 further comprising lips extending inwardly from rear ends of each of the left and right ramp surfaces.

11. The ice chute of claim 1 wherein the ramp comprises opposing left and right ramp surfaces and a front ramp surface that are connected together to form a continuous ramp surface,
wherein each of the left and right ramp surfaces are inclined by an angle $\alpha$ with respect to an axis A extending along a length of the front ramp surface, and
wherein the front ramp surface is inclined by an angle $\beta$ with respect to an axis B that extends along a length of the left and right ramps.

12. The ice chute of claim 11 wherein angle $\alpha$ is different from angle $\beta$.

13. The ice chute of claim 11 wherein angle $\alpha$ is approximately equal to angle $\beta$.

14. The ice chute of claim 11 wherein angle $\alpha$ and angle $\beta$ range from approximately 15° to approximately 60°.

15. The ice chute of claim 10 wherein angle $\alpha$ and angle $\beta$ are each approximately 45°.

16. An ice chute for a drop-in ice bin, the ice bin having an ice storage volume defined by a perimeter wall, a bottom, and a top having a rear covered portion that is covered by a top wall and a front uncovered portion having an opening through which ice is deposited into the ice bin, the ice chute comprising:
a rigid frame having a center opening that is defined by a rear wall, a front wall, and opposed side walls connected between the rear and front walls;
a rear portion of the frame located below the rear covered portion of the ice bin that includes the rear wall and a portion of each of the side walls;
a front portion of the frame disposed in the opening of the ice bin that includes the front wall and a remaining portion of each of the side walls;
a sloped ramp having a lower end that is connected continuously along its length with a portion of each of the side walls and the front wall, the ramp extending upwards and angling outwards from the center opening of the frame at the front portion of the frame only and not extending upwards over the rear portion of the frame, the ramp having a top end wherein an area defined by the top end of the ramp is larger than an area of the opening of the ice bin.

17. The ice chute of claim 16 further comprising a door disposed in the opening of the frame and having sides configured to slide along the side walls of the frame between a front position at the front portion of the frame and a rear position at the rear portion of the frame.

18. A drop-in ice bin apparatus comprising:
an enclosed ice bin having an ice storage volume defined by a perimeter wall, a bottom, and a top having a rear covered portion that is covered by a top wall and a front uncovered portion having an opening through which ice is deposited into the ice bin;
an angled ramp extending upwards at an angle from the front uncovered portion of the ice bin only and not extending upwards over the rear covered portion of the ice bin, the ramp terminating at a top end, wherein an area defined by the top end of the ramp is larger than an area of the opening.

19. The ice bin of claim 18 further comprising a door configured to slide between a front position where the opening of the ice bin is covered and a rear position where the opening of the ice bin is uncovered and ice can be deposited into the ice storage volume via the opening.

* * * * *